(12) United States Patent
Shukla et al.

(10) Patent No.: US 9,992,127 B2
(45) Date of Patent: Jun. 5, 2018

(54) DYNAMICALLY RESIZING AGGREGATION WINDOWS BASED ON NETWORK CONGESTION FEEDBACK FROM MIXED TYPES OF TRAFFIC IN A WIRELESS NETWORK

(71) Applicant: MERU NETWORKS, Sunnyvale, CA (US)

(72) Inventors: Manish Shukla, San Jose, CA (US); Saurabh Bhargava, San Jose, CA (US)

(73) Assignee: Fortinet, INC, Sunnyvale, CA (US)

(*) Notice: Subject to any disclaimer, the term of this patent is extended or adjusted under 35 U.S.C. 154(b) by 139 days.

(21) Appl. No.: 14/985,309

(22) Filed: Dec. 30, 2015

(65) Prior Publication Data

US 2016/0255010 A1    Sep. 1, 2016

Related U.S. Application Data

(60) Provisional application No. 62/098,317, filed on Dec. 30, 2014, provisional application No. 62/099,126, filed on Dec. 31, 2014.

(51) Int. Cl.
| | |
|---|---|
| *H04L 12/807* | (2013.01) |
| *H04L 12/801* | (2013.01) |
| *H04W 24/02* | (2009.01) |
| *H04W 28/02* | (2009.01) |
| *H04L 12/805* | (2013.01) |
| *H04L 12/825* | (2013.01) |
| *H04W 84/12* | (2009.01) |

(52) U.S. Cl.
CPC .............. *H04L 47/27* (2013.01); *H04L 47/12* (2013.01); *H04L 47/127* (2013.01); *H04L 47/26* (2013.01); *H04L 47/365* (2013.01); *H04W 28/0273* (2013.01); *H04W 28/0289* (2013.01); *H04W 84/12* (2013.01)

(58) Field of Classification Search
CPC ..... H04L 12/80; H04L 12/801; H04L 12/807; H04L 47/12; H04L 47/26; H04L 47/27; H04L 47/127; H04L 47/365; H04W 24/02; H04W 28/02; H04W 28/0273; H04W 28/0289; H04W 84/12
See application file for complete search history.

(56) References Cited

U.S. PATENT DOCUMENTS

| | | | |
|---|---|---|---|
| 2006/0072495 A1* | 4/2006 | Mundra | H04M 7/006 370/328 |
| 2006/0193295 A1* | 8/2006 | White | H04L 12/5692 370/336 |

(Continued)

*Primary Examiner* — Tri H Phan
(74) *Attorney, Agent, or Firm* — Law Office of Dorian Cartwright; Dorian Cartwright

(57) ABSTRACT

Aggregation windows are dynamically resized based on network congestion feedback from VOIP and other mixed types of traffic. Feedback indicative of a level of network congestion on the data communication network where aggregate packets are transmitted is received. The network congestion level is checked to see if a predetermined threshold has been exceeded. Responsive to exceeding the threshold, the network congestion level is correlated to an optimal data field size for the aggregated data packets. Further, a MAC layer is configured for the optimal data field size for frame generation. Subsequent aggregated data packets are then transmitted using the optimal data field size.

20 Claims, 6 Drawing Sheets

(56) References Cited

U.S. PATENT DOCUMENTS

| | | | | |
|---|---|---|---|---|
| 2011/0267951 A1* | 11/2011 | Stanwood | ........... | H04L 41/5022 370/235 |
| 2012/0257505 A1* | 10/2012 | Kutscher | ................ | H04L 47/20 370/235 |
| 2013/0114448 A1* | 5/2013 | Koo | ..................... | H04W 24/00 370/252 |
| 2013/0121243 A1* | 5/2013 | Vermani | ............... | H04L 1/0029 370/328 |
| 2013/0128806 A1* | 5/2013 | Vermani | ............... | H04L 1/0028 370/328 |
| 2013/0229996 A1* | 9/2013 | Wang | ................ | H04W 72/0413 370/329 |
| 2014/0079016 A1* | 3/2014 | Dai | ..................... | H04L 5/0041 370/330 |
| 2015/0358067 A1* | 12/2015 | Zhang | ............... | H04B 7/15507 370/315 |
| 2016/0112896 A1* | 4/2016 | Karampatsis | ..... | H04W 28/0252 370/230.1 |
| 2017/0099684 A1* | 4/2017 | Hui | .................... | H04W 76/002 |

* cited by examiner

DYNAMICALLY RESIZING AGGREGATION WINDOWS BASED ON NETWORK CONGESTION FEEDBACK FROM MIXED TYPES OF TRAFFIC IN A WIRELESS NETWORK

CROSS-REFERENCE TO RELATED APPLICATIONS

This application claims the benefit of priority to U.S. Application Nos. 62/098,317, filed Dec. 30, 2014, entitled DYNAMICALLY RESIZING AGGREGATION WINDOWS BASED ON NETWORK CONGESTION FROM MIXED TYPES OF TRAFFIC IN A WIRELESS NETWORK, by Manish SHUKLA, et al. and 62/099,126, filed Dec. 31, 2014, entitled SELF-PROVISIONING IN WI-FI NETWORKING WITH SDN (SOFTWARE-DEFINED NETWORKING) CONTROLLERS USING PREDICTIVE TRAFFIC LOADS IN A WIRELESS COMMUNICATION NETWORK, by Anil KAUSHIK, the contents of each being hereby incorporated by reference in their entirety.

FIELD OF THE INVENTION

The invention relates generally to computer networking, and more specifically, to dynamically resizing aggregation windows based on network congestion from VOIP and other mixed types of traffic.

BACKGROUND

Audio and video consumption on the Internet continues to rise from a baseline of mainly text consumption. Additional bandwidth and speed in the backbone networks, along with price decreases in consumer storage, supports consumer appetites for the richer experience gleaned from audio and video. For example, new protocols such as IEEE 802.11ac provide aggregated packets with large data fields for combining several different packets into a single aggregated packet. Under IEE 802.11ac, every packet is typically an aggregated packet, regardless of content.

Problematically, the rising popularity of VOIP traffic strains network efficiency in a different way. Namely, VOIP traffic can operate on lower data rates (e.g., 54 Mb/s) which keep the channel busy for relatively longer periods of time when filling up the large data fields of aggregated packets. Consequentially, as VOIP traffic increases on a channel using aggregated packets, so do does the collision rate and network congestion.

What is needed is a robust technique to dynamically resize aggregation windows based on network congestion from VOIP traffic or other compositions of traffic.

SUMMARY

The shortcomings of the prior art are addressed by methods, (non-transitory) computer program products, and systems for dynamically resizing aggregation windows based on network congestion feedback from VOIP and other mixed types of traffic, as described herein.

In one embodiment, aggregated data packets are transmitted. Feedback indicative of a level of network congestion on the data communication network is received. The network congestion level is checked to see if a predetermined threshold has been exceeded.

Responsive to exceeding the threshold (or alternatively whether or not threshold is exceeded), the network congestion level is correlated to an optimal data field size for the aggregated data packets. Further, a MAC layer is configured for the optimal data field size for frame generation. Subsequent aggregated data packets are then transmitted using the optimal data field size.

Advantageously, computer performance is enhanced because network congestion caused by VOIP applications over IEEE 802.11ac is reduced.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, (non-transitory) computer program products, and systems for dynamically resizing aggregation windows based on network congestion feedback from VOIP and other mixed types of traffic, as described herein. Generally, one of ordinary skill in the art will recognize that the examples set forth herein are non-limiting and only illustrative of widely-applicable principles. For example, although VOIP traffic over IEEE 802.11ac is referred to throughout the description, one of ordinary skill in the art with recognize how the general principles can be applied to many different circumstances. For example, these techniques can be applied to other types of traffic that affect congestion and to other protocols using resizable aggregated data packets. Further, these techniques can be applied to channels other than Wi-Fi, such as Bluetooth or wired networks.

Figure 2:
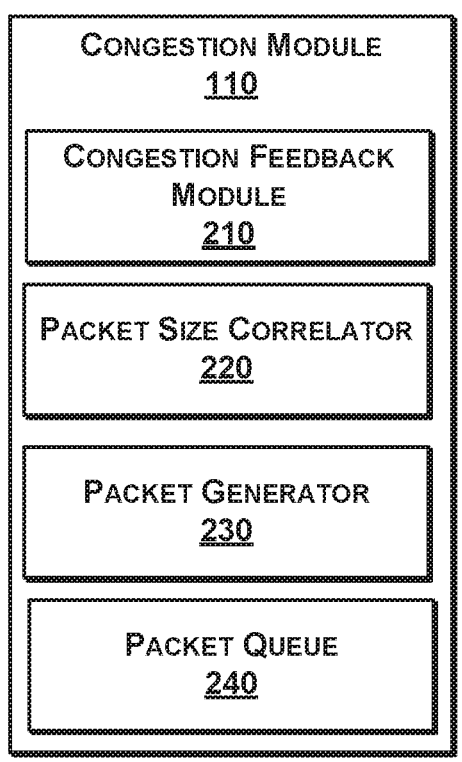
FIG. 2 is a more detailed block diagram illustrating a congestion module of FIG. 1, according to one embodiment.
Figure 3:
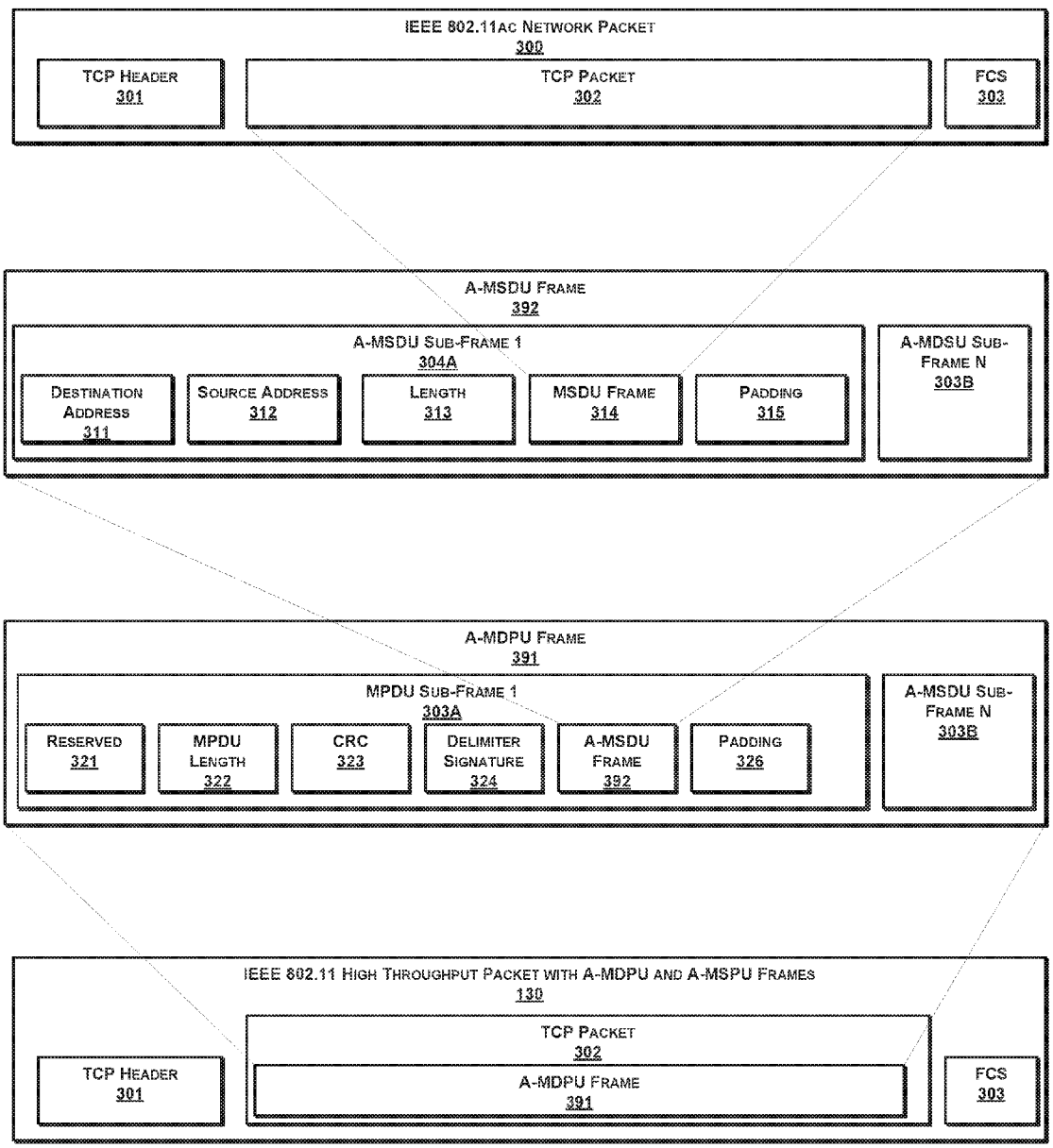
FIG. 3 is a block diagrams illustrating aggregated packet formats, according to one embodiment.

I. Systems to Dynamically Resize Aggregation Windows (FIGS. 1-3)

Figure 1:
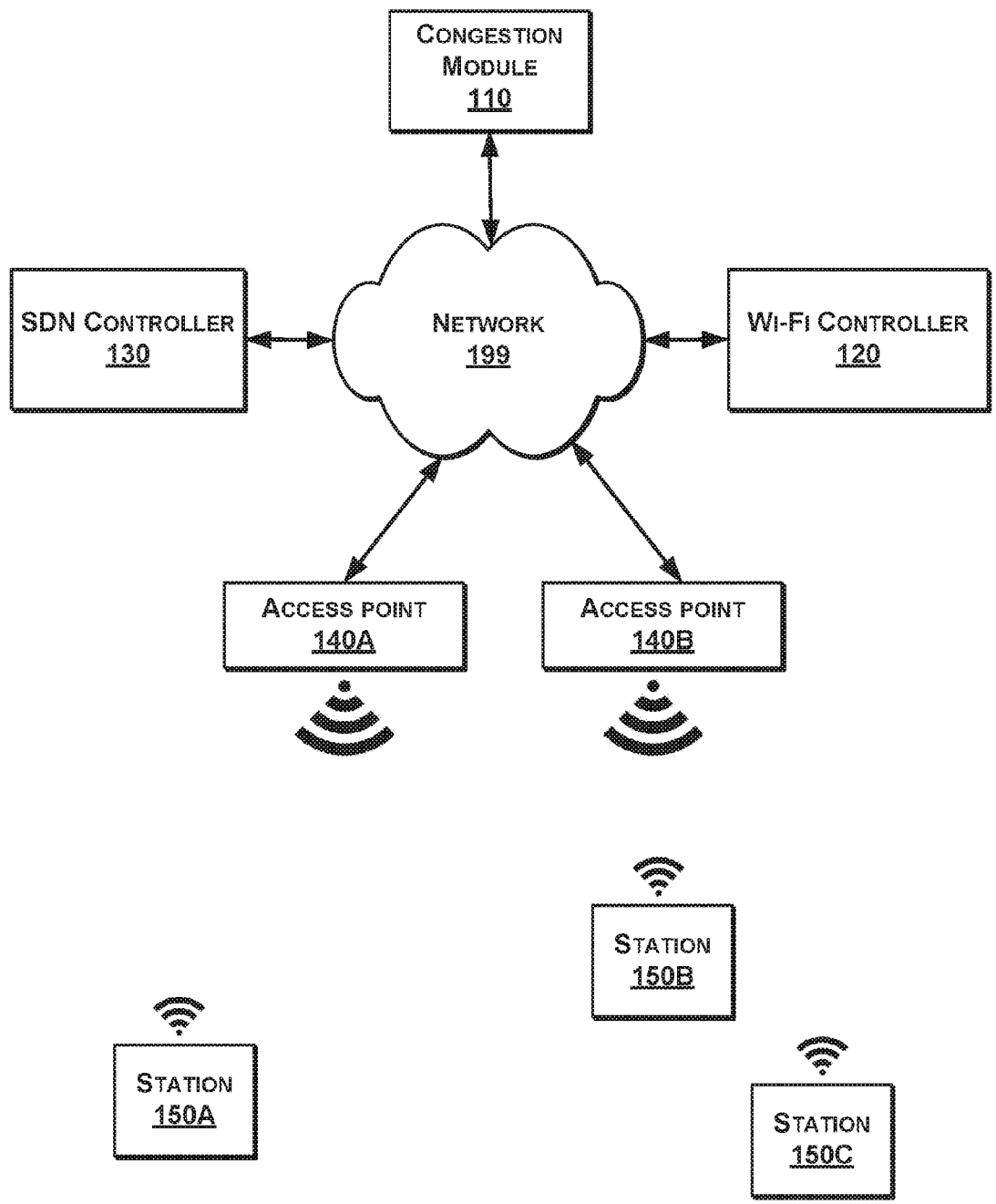
FIG. 1 is a high-level block diagram illustrating a system to dynamically resize aggregation windows, according to one embodiment.

FIG. 1 is a high-level block diagram illustrating a system 100 to dynamically resize aggregation windows, according to one embodiment. The system 100 includes, a congestion module 110, a Wi-Fi controller 120, an SDN (software-defined network controller) 130, access points 140A-140B, and stations 150A-150C. The components can be implemented in hardware, software, or a combination. The system 100 is merely an example of many possible configurations which could include more or less access points, controllers, stations, and can also include well known components such as routers, switches, and firewalls.

A network 199 couples the components in communication for data transfers in the form of frames. Some components are preferably wired to the network 199 (e.g., congestion module 110, Wi-Fi controller 120, SDN controller 130 and access points 140A-140B. The stations 150A-150C are wireless connected to the access points 140A-B on a Wi-Fi network portion. The network 199 can be a LAN, WAN, the Internet, a cloud-based network, a data network, a cellular network, a hybrid network, or the like. The system 100 is merely an example of many possible configurations which could include more or less access points, controllers, stations, and can also include well known components such as routers, switches, and firewalls.

The congestion module 110 responds to network feedback by adjusting the size of aggregated packets (e.g., a variable-sized data field). In one embodiment, network feedback is based on measurements of VOIP traffic relative to other types of traffic to proactively prevent potential collisions from increasing VOIP traffic composition. In another embodiment, network feedback is based on measurements of network congestion resulting from VOIP traffic relative to other types of traffic to adjust to actual collisions resulting from VOIP traffic composition. Measurements can be made from a local perspective or a network-wide perspective. An alternative embodiment switches just VOIP packets to a protocol that does not use aggregated frames.

The congestion module 110 can be integrated with the Wi-Fi controller 120 at an operating system level or installed as an application. Alternatively, the congestion module 110 can be partially or fully integrated with the SDN controller 130, the access points 140A-140B, or the stations 150A-150C. In still other embodiments, the congestion module 130 can be implemented in a dedicated device, or be a cloud-based service provided by a third party. Combinations of implementations are also possible. Further embodiments of the congestion module 110 are discussed below with reference to FIG. 2.

The Wi-Fi controller 120 manages window resizing from a network-side perspective. Measurements of a congestion index or VOIP traffic congestion can be taken from different points around a network to get a better context on overall traffic moving through the backbone. Resulting direction to the access points 140A-140B can provide a packet size for use by all access points, or just a baseline that can be locally modified by local conditions of access points.

The Wi-Fi controller 120 (e.g., an MC1500 or MC6000 device by Meru Networks/Fortinet, Inc. of Sunnyvale, Calif. as described in U.S. application Ser. No. 13/426,703 filed Mar. 22, 2012, now issued U.S. Pat. No. 9,215,754 and commonly-assigned) provides centralized management for the access points 140A-140B. The Wi-Fi controller 120 can provide many other services to the network 199 such as virtual cell and virtual port functionalities (see further description in U.S. application Ser. No. 13/426,703, which is hereby incorporated by reference). In some embodiments, the Wi-Fi controller 120 can be a cloud-based Wi-Fi controller that provides management and monitoring services to the system 100.

The SDN controller 130, in an embodiment, detects VOIP applications and sends configuration instructions. The SDN controller 130 can also indirectly cooperate by predicting network congestion as discussed more fully in U.S. Application No. 62/099,126, filed Dec. 31, 2014. Other indirect actions may affect packet sizes using the OpenFlow or other protocol to directly implement layer 2 rules. More specifically, the SDN controller 130 directs the access points 140A-140B to drop VOIP packets using data plane rules (e.g., OpenFlow rules or any rules to directly affect routing decisions), in an embodiment, which in turn can result in smaller packet sizes being sent by VOIP applications. OpenFlow provides cross-vendor communication as an abstraction of vendor-specific internal programming. Deep packet inspection permits the SDN controller 130 to identify different types of traffic.

More generally, the SDN controller 130 centralizes data plane decision-making for the access points 140A-140B. To do so, the access points 140A-B are configured to concede layer 2 routing decisions to the SDN controller 130 by forwarding packets to the SDN controller 130 for routing instructions. The SDN controller 130 can use input gathered across the network to make layer 2 routing decisions for the packets which are communicated back to the forwarding one of the access points 140A-140B. In one embodiment, routing decisions are made as a reaction to new or unknown flows. In another embodiment, access points are pre-configured by the SDN controller 130 with rules for automatically implementing SDN controller 130 decisions on matching packets in the future. In still another embodiment, the rules or policies are distributed to the other network devices along a routing path for multi-hop data plane control.

The SDN controller 130 can be, for example, a personal computer, a laptop computer, a server, a cloud-based device, a virtual device, or the like implemented in any of the computing devices discussed herein.

The access points 140A-140B implement packet resizing as directed by any or a combination of the congestion module 110, the Wi-Fi controller 120 and the SDN controller 130. More specifically, the access points 140A-140B can react to network congestion or traffic composition by changing a data field size at the MAC layer. In some embodiments, the access points 140A-140B react dynamically in real-time to information fed back.

In general, the access points 140A-140B can individually represent one or more computing devices. For example, the access points 140A-140B can be an AP 110 or AP 433 (modified as discussed herein) by Meru Networks/Fortinet, Inc. of Sunnyvale, Calif. Each access point 140A-140B is preferably connected to the network 199 (e.g., gateway, switch, router, hub, or another access point that is connected to the network 199) via a wired connection, but in some embodiments, such as a mesh network, the uplink connection is wireless. The access points 140A-140B can be set-up in various configurations to provide wireless coverage areas. In another embodiment, the functionality is incorporated into a switch or router.

The stations 150A-150C devices accessed by a user or running a program such as a VOIP application or a video application. Examples of VOIP applications include IP-based home telephones, Google Voice, Skype telephone calls, and the like. The VOIP applications can be installed on the stations 150A-150C or execute remotely using a browser, for example. A VOIP application can also be executing on a device accessing one of the stations 150A-150C as a hot spot.

More generally, the stations 150A-150C can be, for example, a personal computer, a laptop computer, a tablet computer, a smart phone, a mobile computing device, an Internet appliance, a non-wireless device modified to have wireless capabilities, or any other appropriate processor-driven computing device. A station is wirelessly coupled to an access point. No pre-configuration or client is needed, in an embodiment.

FIG. 2 is a more detailed block diagram illustrating the congestion module 110 of FIG. 1, according to one embodiment. The congestion module 110 comprises a congestion feedback module 210, a packet size correlator 220, a packet generator 230 and a packet queue 240. Other embodiments are possible.

The congestion feedback module 210 provides data on actual or predicted network congestion. In one case, actual congestion data is measured locally, such as downstream from a particular access point. In another case, actual congestion data is measured network-wide by one or more sensors or by the Wi-Fi controller 120 or by the SDN controller 130. Congestion data can be limited to only VOIP traffic (e.g., a gross amount of VOIP traffic, or a ratio of VOIP traffic relative to other types), or can include all types of traffic. Measurements can be taken periodically or on demand. In one embodiment, network congestion is predicted based on implementation-specific factors such as network congestion history, a change in a number of connected devices, or planned events. Predictions can be taken alone as a measurement, or in combination with actual measurements. Upstream devices such the Wi-Fi controller 120 and the SDN controller 130 can also provide values for congestion measurement that are implemented at an access point.

The packet size correlator 220 identifies an optimal packet size based on network congestion feedback. In an embodiment, a table of values is prepopulated and network congestion feedback or a derivate thereof is utilized an index into the table. In another embodiment, packet sizes are provided by upstream devices or by peer devices.

The packet generator 230 composes data packets at a MAC layer responsive to the optimal packet size. The maximum length of an A-MPDU field is controlled by the value of a filed called Maximum A-MPDU Length Exponent, which describes maximum length of an A-MPDU by the formula $2^{(13+Exponent)}-1$ bytes. Under IEEE 802.11ac, values for the exponent range from 0 to 7 which allow the maximum-MPDU length to range from 8 KB to 1 MB. The resulting packets can be stored in the packet queue 240 until further processed or transmitted. For frame aggregation, the packet generator 230 can look ahead in the packet queue 240 to find frames for coalescing into a single aggregate frame. In one example, just VOIP data packets can be aggregated while others are sent using standard aggregated data packets. The IEEE 802.11ac protocol transmits all frames using an aggregate MPDU (A-MPDU) format, even for single frames. The MAC layer controls framing responsibility, leaving the physical layer with just the total length of what it transports. One embodiment of the packet generator 230 uses a non-aggregating protocol for VOIP packets, and can use a different radio or communication channel.

FIG. 3 is a block diagram illustrating aggregated packet formats 300, according to one embodiment. An initial IEEE 802.11 packet 101 includes a TCP (or UDP) packet 302 along with a (physical layer) header 301. The TCP packet 302 can hold up to 1,300 bytes in some embodiments. The TCP packet 302 can include a TCP header (not shown) with fields for frame control, duration/ID, address, sequence control, and the like. The frame control field can include fields for protocol version, type, subtype, to DS, from DS, more fragments, retry, power management, WEP, order, and the like. Additionally, an FCS 303 (Frame Check Sequence) ensures data integrity.

An A-MSDU 392 frame can include a data as MSDU sub-frames 304A, 304B and header data. The data packet was increased to nearly 8 k under IEEE 802.11n and 802.11ac. The header data can include fields for a destination address 311, source address 312, length 313 and padding 315.

An A-MPDU frame 391 includes MPDU sub-frames 303A, 303B and header data. The A-MPDU frame 391 can be hold up to 1 Mb under the IEEE 802.11ac standard. Under the technique described herein, 64 packets of up to 8 k bytes accounts for about 480 kb, well within the limit. Other fields can include reserved 321, MPDU length 322, CRC 323, delimiter signature 324 and padding 326. MPDU.

Finally, an IEEE 802.11 high throughput packet with A-MPDU and A-MSDU frames 130 is composed of a (A-MPDU PHY) header 301, a A-MPDU frame 491 and an FCS 303, similar to IEEE 802.11 network packet 101. However, the TCP packet 302 has been replaced with the A-MPDU frame 491 and any supporting data needed. In symbolic form, IEEE 802.11 High Throughput Packet={header, A-MPDU} where A-MPDU={A-MSDU1, A-MSDU2 . . . , A-MSDUn} where A-MSDU(i)={{DA, SA, TCP Packet1, Padding}, {DA, SA, TCP Packet2, Padding}, . . . {{DA, SA, TCP Packetn, Padding}}. MPDU.

II. Methods for Dynamically Resizing Aggregation Windows (FIGS. 4-5)

Figure 4:
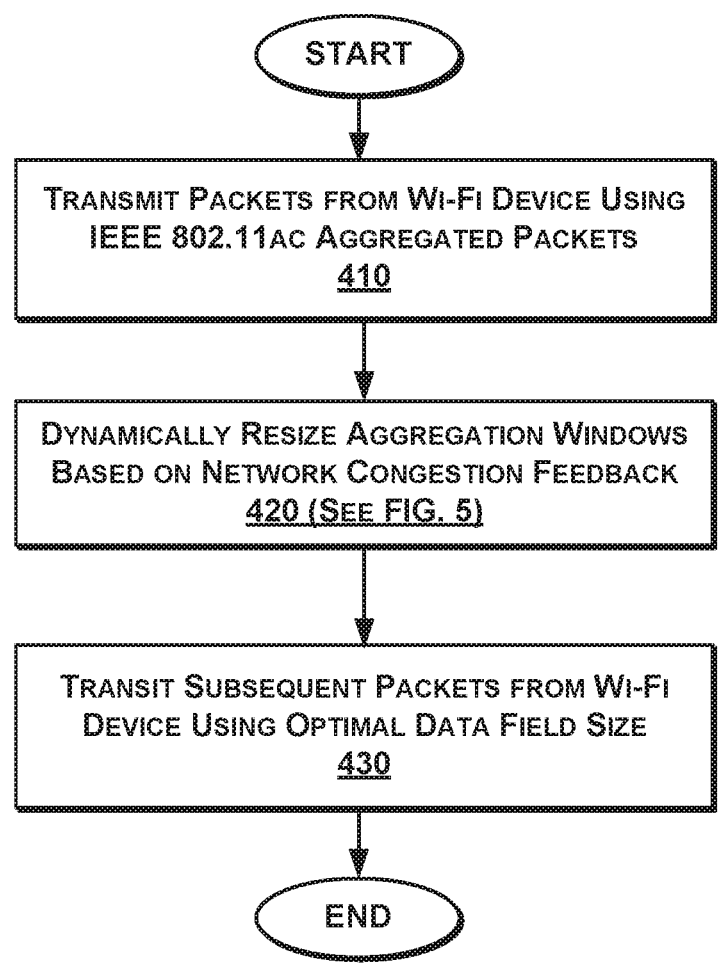
FIG. 4 is a block diagram illustrating a method for optimally sizing aggregate packets based, according to one embodiment.

FIG. 4 is a block diagram illustrating a method for optimally sizing aggregate packets based, according to one embodiment. One of ordinary skill in the art will recognize that the method 400 is non-limiting as other embodiments can have more or less steps and can be performed in a different order.

Packets are transmitted from Wi-Fi devices using IEEE 802.11ac aggregated packets (step 410). Aggregation windows are dynamically resized based on network congestion feedback (step 420), as is described in more detail below with respect to FIG. 5. Subsequent packets are transmitted from the Wi-Fi device using optimal data field size (step 430).

Figure 5:
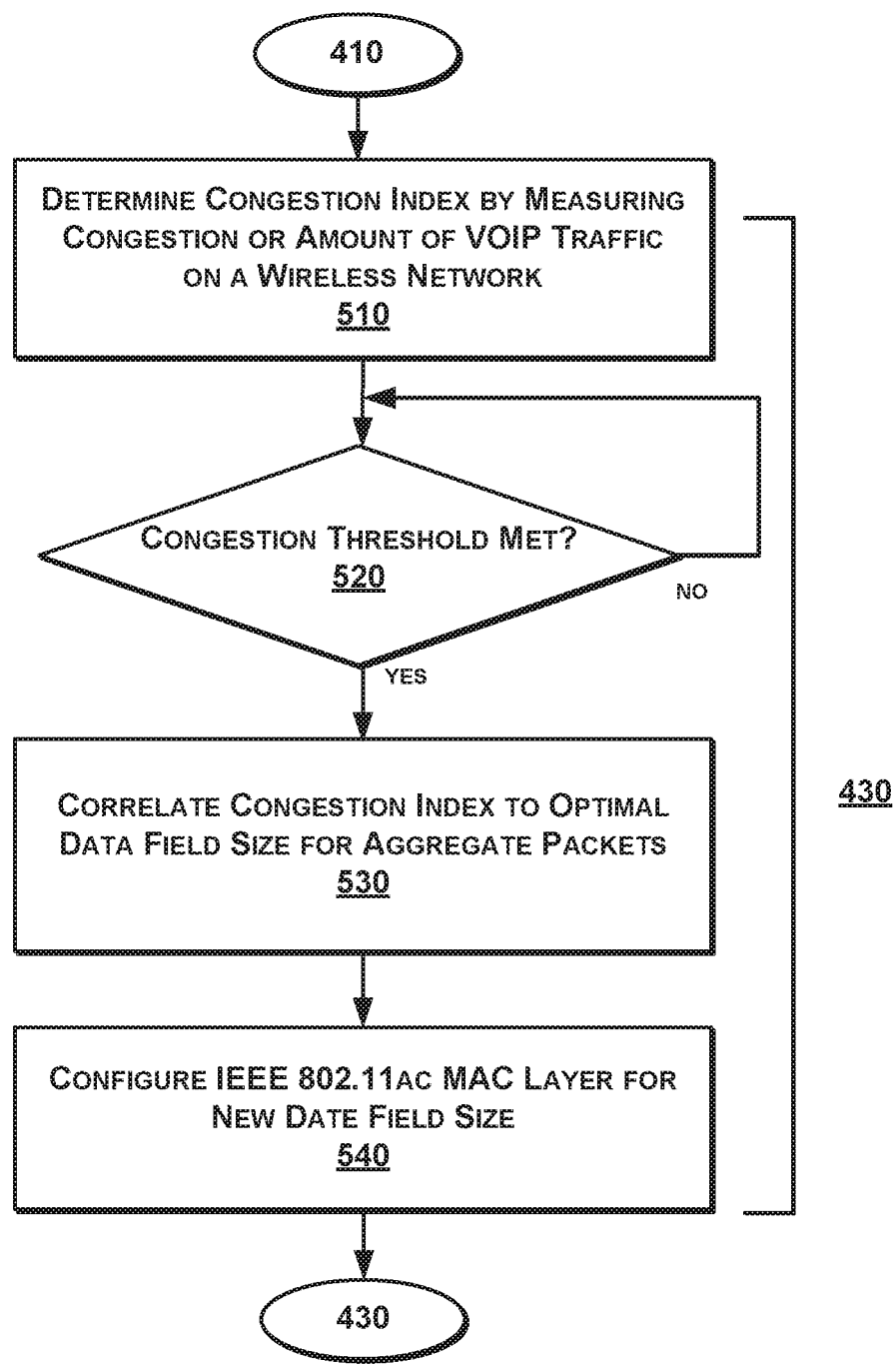
FIG. 5 is a more detailed block diagram illustrating a step for dynamically resizing aggregation windows based on network congestion feedback of FIG. 4, according to one embodiment.

FIG. 5 is a more detailed block diagram illustrating the step 430 for dynamically resizing aggregation windows based on network congestion feedback of FIG. 4, according to one embodiment.

A congestion index can be determined by measuring network congestion (step 510). Alternatively, an amount of VOIP traffic can be measured as an indicator of potential network congestion. When a congestion index threshold is met (step 520), the congestion index is correlated to an optimal data field size for aggregate packets (step 530). MAC layer packets are configured for a new data field size, according to IEEE 802.11ac or other protocols (step 540).

III. Generic Computing Device (FIG. 6)

Figure 6:
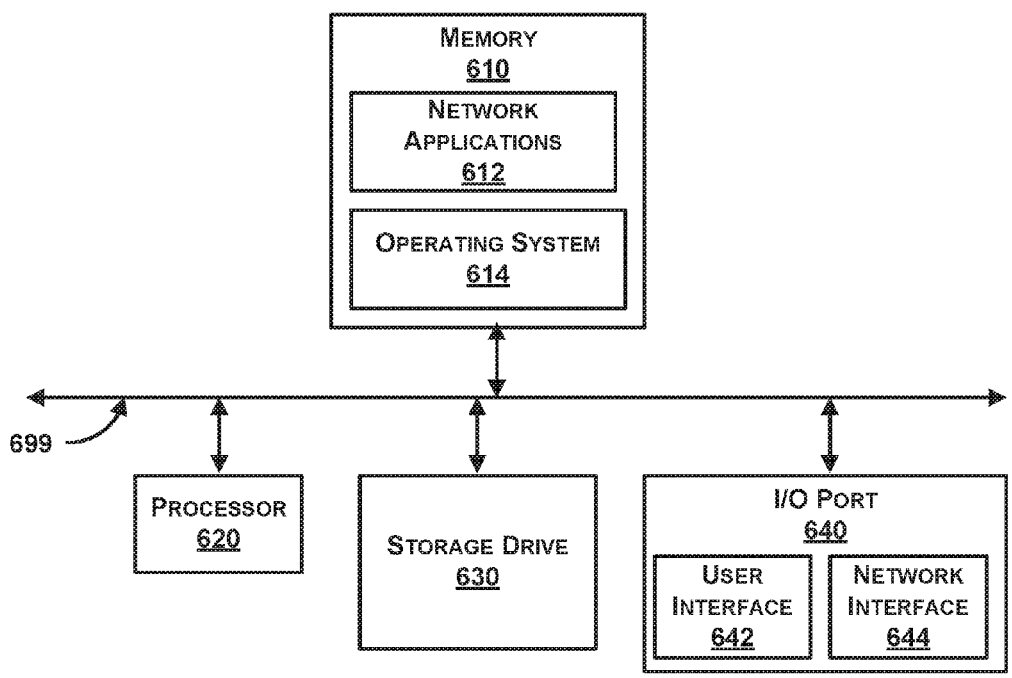
FIG. 6 is a block diagram illustrating an exemplary computing device, according to one embodiment.

FIG. 6 is a block diagram illustrating an exemplary computing device 600 for use in the system 100 of FIG. 1, according to one embodiment. The computing device 600 is an exemplary device that is implementable for each of the components of the system 100, including the congestion module 110, the Wi-Fi controller 120, the SDN controller 130, the access points 140A, 140B, and the stations 150A-150C. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the components illustrated in FIGS. 1. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 65, 68, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method on a Wi-Fi device connected to a data communication network for dynamically resizing aggregation windows based on network congestion feedback, the method comprising the steps of:

transmitting aggregated data packets, the aggregated data packets having a data field of varying size;

receiving feedback indicative of a level of network congestion on the data communication network;

determining that the network congestion level exceeds a predetermined threshold;

correlating the network congestion level to an optimal data field size for the aggregated data packets;

configure a MAC layer for the optimal data field size;

detecting VOIP (voice over internet protocol) data packets among other types of data packets in a queue;

coalescing just VOIP data packets into aggregate data packets using the optimal data field size; and transmitting subsequent aggregated data packets using the optimal data field size.

2. The method of claim 1, further comprising:

continuing to use a standard data field size for aggregate data packets for data packets in the queue that are not VOIP data packets.

3. The method of claim 1, further comprising:

predicting a future level of network congestion, wherein the optimal data field size is based at least in part of the predicted future network congestion level.

4. The method of claim 1, wherein the network congestion level is comprises exclusively of an amount of VOIP (voice over internet protocol) traffic.

5. The method of claim 1, wherein the network congestion is comprised at least in part a ratio of VOIP traffic relative to other types of traffic.

6. The method of claim 1, wherein the aggregated data packets comprise IEEE 802.11ac aggregated data packets.

7. The method of claim 1, wherein the Wi-Fi device comprises an access point, wherein network congestion level comprises an access point congestion level from downstream of the access point.

8. The method of claim 1, wherein the Wi-Fi device comprises one of a Wi-Fi controller and an SDN (software-defined networking) controller, wherein network congestion level comprises a network-wide congestion level.

9. A non-transitory computer-readable medium storing source code that, when executed by a processor, performs a method load for on a Wi-Fi device connected to a data communication network for dynamically resizing aggregation windows based on network congestion feedback the method comprising the steps of:
   transmitting aggregated data packets, the aggregated data packets having a data field of varying size;
   receiving feedback indicative of a level of network congestion on the data communication network;
   determining that the network congestion level exceeds a predetermined threshold;
   correlating the network congestion level to an optimal data field size for the aggregated data packets;
   configure a MAC layer for the optimal data field size;
   detecting VOIP data packets among other types of data packets in a queue;
   coalescing just VOIP data packets into aggregate data packets using the optimal data field size; and
   transmitting subsequent aggregated data packets using the optimal data field size.

10. The non-transitory compared readable media of claim 9, wherein the method further comprises:
   continuing to use a standard data field size for aggregate data packets for data packets in the queue that are not VOIP data packets.

11. The non-transitory compared readable media of claim 9, wherein the method further comprises:
   predicting a future level of network congestion, wherein the optimal data field size is based at least in part of the predicted future network congestion level.

12. The non-transitory compared readable media of claim 9, wherein the network congestion level is comprised exclusively of an amount of VOIP traffic.

13. The non-transitory compared readable media of claim 9, wherein the network congestion is comprised at least in part a ratio of VOIP traffic relative to other types of traffic.

14. The non-transitory compared readable media of claim 9, wherein the aggregated data packets comprise IEEE 802.11ac aggregated data packets.

15. The non-transitory compared readable media of claim 9, wherein the Wi-Fi device comprises an access point, wherein network congestion level comprises an access point congestion level from downstream of the access point.

16. The non-transitory compared readable media of claim 9, wherein the method further comprises:
   continuing to use a standard data field size for aggregate data packets for data packets in the queue that are not VOIP data packets.

17. A Wi-Fi device connected to a data communication network for dynamically resizing aggregation windows based on network congestion feedback, the Wi-Fi device comprising:
   a processor; and
   a memory, storing:
      a first module to transmit aggregated data packets, the aggregated data packets having a data field of varying size;
      a second module to receive feedback indicative of a level of network congestion on the data communication network;
      a third module to determine that the network congestion level exceeds a predetermined threshold;
      a fourth module to correlate the network congestion level to an optimal data field size for the aggregated data packets; and
      a fifth module to configure a MAC layer for the optimal data field size,
      a sixth module to detect VOIP (voice over internet protocol) data packets among other types of data packets in a queue,
      a seventh module to coalesce just VOIP data packets into aggregate data packets using the optimal data field size,
      wherein the first module transmits subsequent aggregated data packets using the optimal data field size.

18. The Wi-Fi device of clam 17, further comprising:
   an eight module to predict a future level of network congestion, wherein the optimal data field size is based at least in part of the predicted future network congestion level.

19. The Wi-Fi device of clam 17, wherein the network congestion level is comprised exclusively of an amount of VOIP traffic.

20. The Wi-Fi device of clam 17, wherein the Wi-Fi device comprises one of a Wi-Fi controller and an SDN (software-defined networking) controller, wherein network congestion level comprises a network-wide congestion level.

* * * * *